United States Patent [19]
Gibson et al.

[11] 3,818,223
[45] June 18, 1974

[54] DEVICE FOR DETECTING CARBON ON CIGARETTE FILTER TIPS

[75] Inventors: Gerald Warren Gibson; Ned A. Sigmon; Ransom Pitts Kirby, all of Durham, N.C.

[73] Assignee: Liggett & Myers Incorporated, New York, N.Y.

[22] Filed: Mar. 8, 1973

[21] Appl. No.: 339,342

[52] U.S. Cl................ 250/223, 131/21 R, 131/94, 250/572, 356/102, 356/212, 356/224, 356/237
[51] Int. Cl............................................ G01n 21/26
[58] Field of Search........... 356/237, 209, 102, 199, 356/200; 250/223; 209/111.7

[56] References Cited
UNITED STATES PATENTS

| | | | |
|---|---|---|---|
| 3,334,240 | 8/1967 | Black | 250/223 R |
| 3,473,037 | 10/1969 | Schmermund | 250/223 R |
| 3,555,287 | 1/1971 | Schmermund | 250/223 R |
| 3,729,636 | 4/1973 | Merker | 250/223 R |

FOREIGN PATENTS OR APPLICATIONS 675,386  12/1963  Canada............................ 209/111.7

Primary Examiner—Ronald L. Wibert
Assistant Examiner—Steven Morrison
Attorney, Agent, or Firm—Kenyon & Kenyon Reilly Carr & Chapin

[57] ABSTRACT

Device for detecting faults, such as carbon granules, smudges, and/or other dark areas on the end of cigarette filters, including sources of light energy for casting light on a cigarette filter being inspected, photocells positioned for individually scanning the filter tips as the cigarettes travel on a conveyor through an inspection zone, and a detection circuit for producing a floating reference signal which is derived from the highest repeating signal levels from normal filter tips previously inspected. The detection circuit compares the instantaneous signals produced from the photocells with the floating reference signal in a manner whereby the dark area, resulting from a fault such as a carbon particle, when scanned by the photocells will produce an instantaneous sensing signal differing from the floating reference signal so as to indicate the presence of a fault. The detection circuit automatically compensates for variations in color and texture of the filter tip material that could otherwise cause detection failure when utilizing a fixed type of reference. According to a further embodiment, the detection circuit includes an amplifier-filter section having a frequency response characteristic which enables the device to detect the smaller size faults with substantially the same ease as the relatively larger size faults.

22 Claims, 17 Drawing Figures

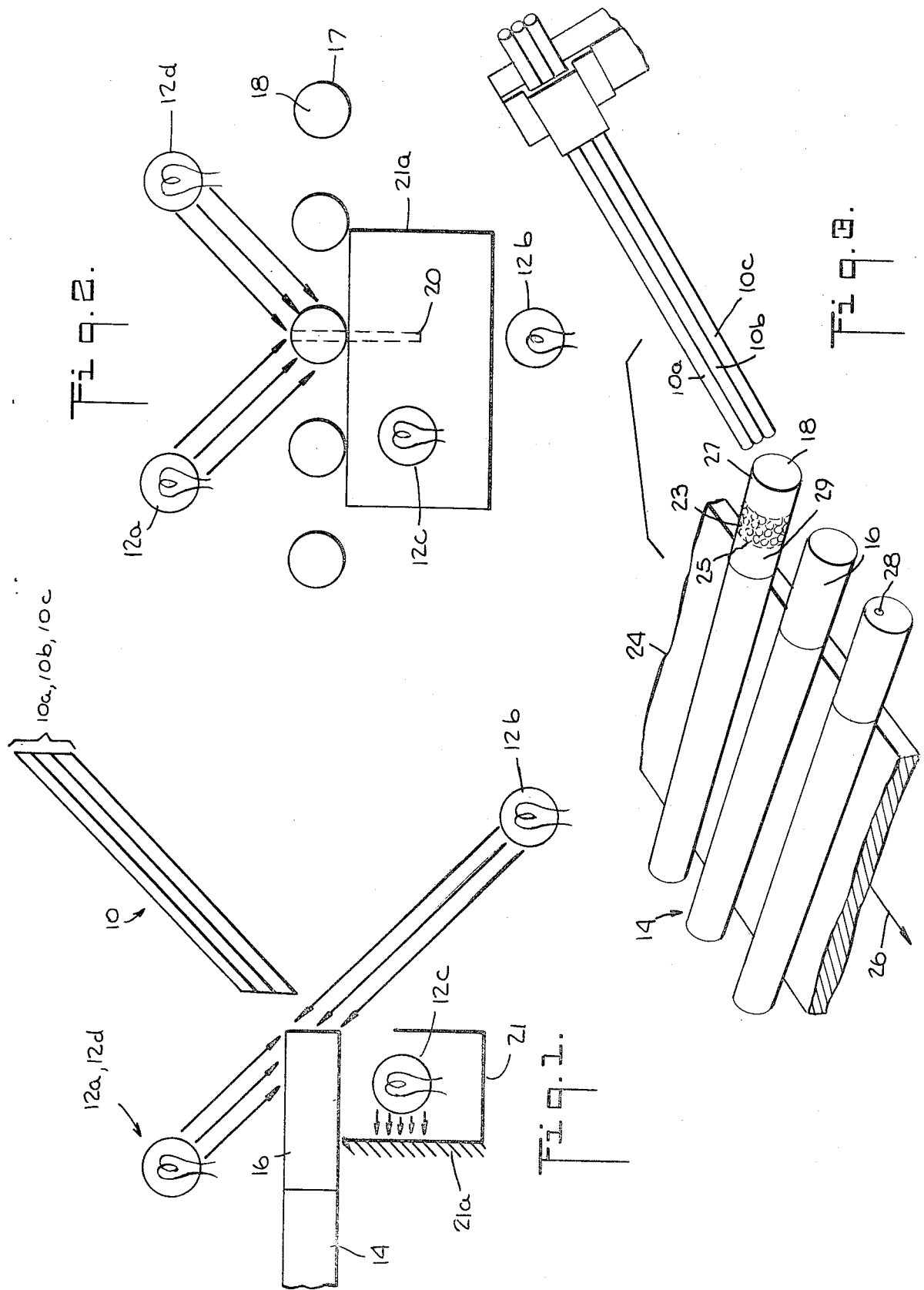

DEVICE FOR DETECTING CARBON ON CIGARETTE FILTER TIPS

BACKGROUND OF THE INVENTION

1. Field of the Invention

The present invention relates to photoelectric detection means, and more particularly to a device for detecting faults, such as granules, smudges, and/or other dark areas on the end of cigarette filters and for generating electrical signals for each detection.

2. Description of the Prior Art

In the manufacture of certain types of cigarettes, carbon granules are inserted in a chamber formed between two cylindrical plugs of filter material at the filter tip end of the cigarette. On occasion, one or more of these carbon granules find their way to the end surface of a cigarette filter tip. Also, dark carbon smudges may be found on an end surface. The carbon granules as well as the dark carbon smudges are considered to be "faults" in the cigarette filter tip. Other types of faults include missing filter plugs, and air spaces between the filter plug and the filter tip paper which can cause a short circuit path for the smoke around the cellulose filter. Still further types of faults include filter tip paper which is not properly glued together so that a flap of filter tip paper remains at the seam, filter tips having extra pieces of filter tip paper inadvertently adhered to such tip, and grossly malformed filter plugs. In any of the above cases, the cigarette showing a fault must be singled out and removed from the packaging line. It is extremely difficult to employ photoelectric scanning means to detect these faults, such as the visible carbon granules or sumdges at the surface of cigarette filter tips, because of the extremely small light variations caused by the small carbon granules, the speed of detection required, and the variability of light reflected from the filter tips being inspected. For example, the black spot area of a carbon granule covers about one one-hundredth of the entire tip surface area. Therefore, the photoelectric sensor must detect one part in one hundred if such spot is to be seen by the sensor. Even where a plurality of sensors are employed to reduce the filed of view covered by a single sensor, the requirements of speed of detection and the space limitations on the number of sensors greatly inhibit the efficiency of the detecting process.

In addition to the fact that the photoelectric sensor must have a small field of view in order to detect the presence of the relatively minute carbon granule, the detection device must be able to take into account the many variables that effect the amount of light reflected for the normal filter tips, such as the color and texture of the filter tip material. Because of the small resolution of the carbon particle area to the cross-sectional area of the filter tip, these variables can cause inaccurate operation of the detection device.

SUMMARY OF THE INVENTION

It is an object of the present invention to provide a photoelectric sensing device for detecting faults, such as carbon granules, smudges, and/or other dark areas at the surface of a cigarette filter tip.

It is another object to provide a photoelectric sensing device for detecting carbon granules wherein the ratio of the carbon particles area to the filter tip area seen by a sensor is increased.

It is another object to provide a photoelectric sensing device for detecting faults wherein the sensor signals are electronically enhanced to provide increased resolution between the normal filter tip signals and the signals from faulty filter tips.

It is another object to provide a photoelectric sensing device which enables detection of the relatively smaller size faults with substantially the same ease as the larger faults.

It is another object to provide a photoelectric sensing device for detecting faults which automatically compensates for the many variables that could cause failure of detection devices, such as color and surface texture variations in the filter tip.

It is a further object to provide a photoelectric sensing device which permits high scanning rates in the detection of very samll size carbon granules at the surface of cigareette filter tips.

These and other objects, which will become apparent from the detailed disclosure and claims to follow, are achieved by the present invention which provides a device for detecting faults, such as carbon granules, smudges, and/or other dark areas on the end of cigarette filters. The device includes sources of light energy for casting light on the cigarette filter being inspected, and photoelectric sensors positioned for individually scanning a filter tip and receiving light reflected from such filter tip. The sensors are connected in a circuit so that changes in the reflected light received by such sensors cause corresponding electrical signals to be supplied to the amplifier and filter circuits. Reference and comparator circuits compare the instantaneous detection signals from each photoelectric sensor with floating reference signals derived from previous signals from each sensor. The floating reference signals are derived from the highest repeating signal levels from normal filter tips previously inspected. Instantaneous detection signals are compared with the respective floating reference signals in a manner whereby a dark area on a filter tip causes a sensor output that is greater than the reference level, indicating the presence of a fualty filter tip, i.e., carbon granules at the tip surface.

The floating reference automatically compensates for variations in color and texture of the filter tip material that could otherwise cause detection failure when utilizing a fixed type of reference.

The reference and comparator circuit includes the parallel combination of a resistor and a diode connected in series with the output of the amplifier and filter circuit and one side of a capacitor. The other side of such capacitor is connected in series with an output resistor. In operation, the photoelectric sensor supplies an alternating current output signal to the amplifier and filter circuit resulting from the movement of the filter tips past the sensors, and the positive portion of the alternating current signals is utilized to charge the capacitor through the diode. The capacitor will charge to a value which is commensurate with the maximum repeating positive output level from the amplifier and filter circuit for the previously inspected normal cigarettes, less the forward voltage drop across the diode. This charge across the capacitor becomes the floating reference voltage for the detection circuit.

In order to provide current through the output resistor, the positive signal produced from the inspected cigarette filter tip must be greater than the reference voltage across the capacitor plus the forward voltage drop across the diode. When a dark spot or carbon granule crosses the sensor's field of view, the amplifier output signal will be at a voltage level which is greater than the sum of the reference and diode voltages so that the diode will be forward biased and current will flow in the circuit and through the output resistor. The resistor, which is connected in parallel with the diode, permits a slow discharge of the reference capacitor so that it can follow decreasing reference level changes. In this manner, the floating reference automatically compensates for variations in the color and texture of the filter tip material.

The floating reference of the present invention provides increased resolution between the carbon granules and the cross-section area of the filter tip. It also automatically compensates for the many variables that would cause failure of any device employing a fixed type of reference. These variables include: color variations in tipping paper; tipping paper surface texture variations; filter tow variations; variations in the surface characteristics of the filter tip affected by cutter sharpness, etc.; electronic drift due to component aging, temperature and power line voltage variations; illumination variations due to voltage variations and aging; variations in the roundness of the cigarettes being viewed; and any other long termin variations that might cause changes in the signals being produced by the sensors or other electrical components.

Larger carbon particles cover a greater portion of the photosensor's field of view than do the relatively smaller particles, thus creating light variations of greater magnitude than those produced by the smaller particles. However, when the smaller particles pass through the photosensor's field of view, they create light variations that contain generally higher frequency components than the frequency components contained in the light variations caused by the larger particles. Therefore, it is ordinarily more difficult to detect the smaller particles because of the relatively smaller magnitude of the light variations they produce. According to an embodiment of the present invention, the amplifier and filter circuit is designed to be more sensitive to the higher frequency signals than to the lower frequency singals. More particularly, the amplifier and filter circuits are designed so that the magnitude of amplification is greater for the higher input signal frequencies than for the lower input signal frequencies. This is generally due to the fact that the lower input signal frequencies are blocked to a greater extent by the filter circuits than the higher input signal frequencies. In this fashion, the higher frequency input signals created by the smaller particles will be amplified by a larger factor than the lower frequency signals created by the larger carbon particles.

BRIEF DESCRIPTION OF THE DRAWINGS

In the accompanying drawings:

FIG. 1 is a side view of the detector device including the lamp and photoelectric sensor arrangement for operation in the area of a filter tip, illustrative of the invention;

FIG. 2 is a front view of the lamps shown in FIG. 1;

FIG. 3 is a perspective view of the scanning sensors positioned for inspecting filter tips passing into the field of view of the sensors;

DESCRIPTION OF THE PREFERRED EMBODIMENTS

Figure 5:
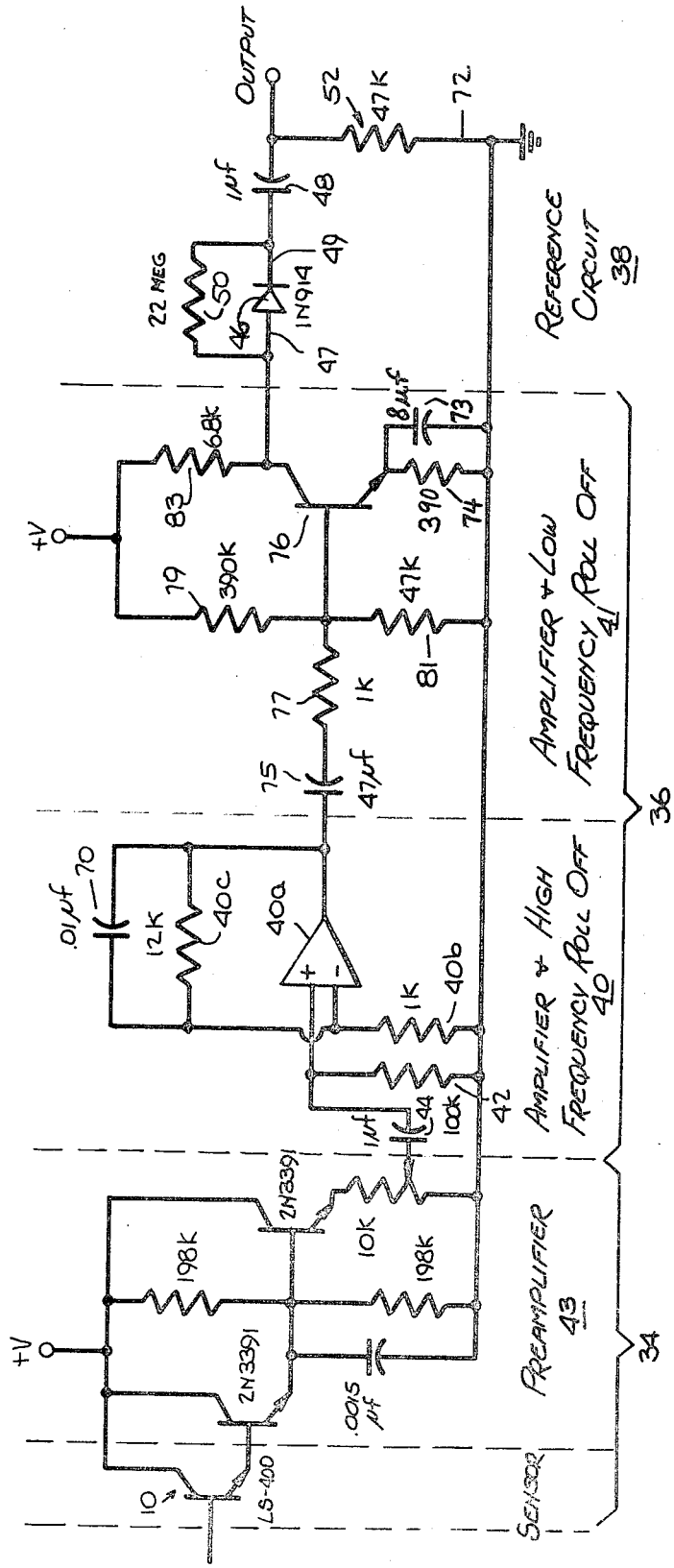
FIG. 5 is a circuit diagram of the detection circuitry, illustrative of the invention.

Referring to FIGS. 1 and 2, there is shown the position of the photoelectric sensors 10 and the light energy sources 12 in relation to cigarettes 14 and their filter tips 16. The photoelectric sensors 10 used in the detection circuit are silicon phototransistors which are used primarily because of its microsecond response time. Each sensor 10a, b, or c produces a variation in output current passing therethrough in direct relation to the amount of light intensity received on the sensor 10. It is noted that other suitable photoelectric sensor devices than the silicon phototransistor can be employed.

Each of the light energy sources 12 is a conventional incandescent lamp; however, other lamps, such as a neon gas discharge type lamp, might be employed. The lamps 12 comprise tipping paper lamps 12a and 12d, a tip lamp 12b and a background lamp 12c.

The tipping paper lamps 12a and 12d are mounted in a position substantially above and to either side of the filter tip 16. This position allows lamps 12a and 12d to illuminate tipping paper 17 without casting light on either a background wall 21a or the end surface 18 of filter tip 16.

The background lamp 12c is mounted in a position substantially vertically lower and horizontally offset from the filter tip 16. Lamp 12c is set within the partial enclosure formed by a background housing 21. The background wall 21a of housing 21 is coated with a white paint which provides a light background in the path of the sensor's field of view 20 when the cigarette 14 has passed out of such field of view 20. The field of view 20 is defined by the shape of the aperture in the housing of sensor 10. Lamp 12c can neither illuminate the upper portion of tipping paper 17 nor the filter tip end surface 18.

The tip lamp 12b is mounted in a position opposite to and vertically offset from the filter tip surface 18 so that the rays of light from lamp 12b are reflected from the surface 18 onto the sensors 10. Lamp 12b can neither illuminate the upper portion of tipping paper 17 nor the background 21a.

In operation, as the sensors 10 scan a single cigarette 14, they receive reflected light from three areas: (1) from the end surface 18 of the filter tip; (2) from the upper side of the tipping paper 17 encircling the filter tip 16; and (3) from the background wall 21a when the cigarette 14 has passed from the sensors' field of view 20. With the lighting arrangement shown in FIGS. 1 and 2, the light being reflected from each of these three areas is balanced to a suitable degree whereby the sensors 10 receive a substantially constant light input which is interrupted only by unusual disturbances, such as carbon particles, etc. Each of the four light sources 12a, b, c and d have individually adjustable light intensities. Furthermore, due to the position of each lamp, a change in the intensity of any one lamp has negligible effect on the filed illuminated by either of the other three lamps.

With the above system, illumination of the filter tips 16 being scanned can be provided whereby light variations from normal cigarettes are minimized, thus making the system more sensitive to the unusual lighting variations caused by carbon particles, etc.

Each photoelectric sensor 10 is mounted in a stationary manner adjacent the path of travel of the cigarettes 14 so that the sensor's field of view 20 impinges on the tip surface 18. As shown in FIGS. 1, 2 and 3, each photoelectric sensor 10 is positioned at an oblique angle relative to the longitudinal axis of the filter tip 16 so that the sensor's field of view 20 impinges on the filter tip at its surface 18. It is noted that the use of the light background wall 21a and the positioning of the sensors 10 at an oblique angle are effective to avoid sensing of the small unlighted area between the cigarette 14 and the surface on which it is transported. This shadow would otherwise be seen by the sensors 10 as a dark area, in the absence of the oblique positioning of sensors 10 and the light background wall 21a.

Referring again to FIG. 3, carbon granules 23 are ordinarily packed in a chamber 25 formed between two cylindrical plugs 27 and 29 of filter tip material so that the granules 23 and the filter plugs 27 and 29 constitute the filter tip 16. The cigarettes 14 are passed on a conveyor medium 24 in the direction indicated by arrow 26. As the filter tips 16 individually pass the photoelectric sensors 10, the tip surfaces 18 are inspected by the sensors 10 for the presence of carbon granules, such as the granule indicated by numeral 28.

It is to be understood that, while the above description describes the detection of black carbon granules and smudges, the description is intended to also apply to the detection of any other dark areas in the sensor's filed of view. These other dark areas indicate faults such as missing filter plugs, and air spaces between a filter plug and its filter tip paper. Such air spaces can create a short circuit condition wherein the smoke escapes around the cellulose filter. Other faults which can be detected as a dark area include a filter tip paper which is not properly glued together, thereby leaving a flap of paper at the seam, a filter tip having extra pieces of filter tip paper inadvertently adhered to such tip, and a grossly malformed filter plug.

Figure 4C:
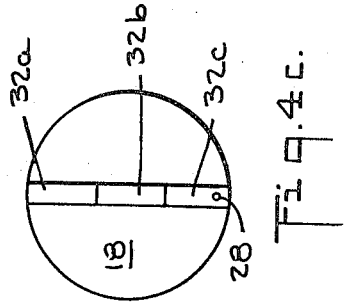
FIGS. 4A, B and C illustrate the manner whereby the multiple photoelectric sensors are used to increase the carbon granule area to filter tip area ratio.
Figure 4B:
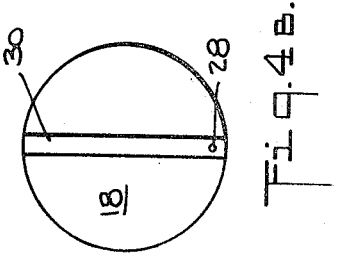
Figure 4A:
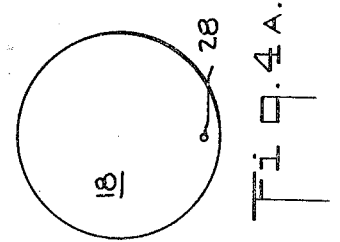

Referring to FIGS. 4A, B and C, there is shown a cross-sectional view of the filter tip end surfaces 18 with the carbon granules 28 shown in the foreground. The actual size of the black spot or carbon granule area is about one one-hundredth of the tip surface area. Therefore, if a sensor 10 were employed which covered the entire tip surface 18 in its field of view, such sensor would be required to detect one part in one hundred if the granules were to be seen by such sensor. In this connection, it is noted that the minimum detectable granule size can be as small as one two-hundredths of the cross-sectional area of the tip surface 18. However, as illustrated by FIG. 4B, the field of view of a single sensor 10 can be restricted to the narrow rectangular area or slit 30, thereby increasing the resolution of the granule area to filter area ratio. In this case, the same granule 28 now constitutes about one-twentieth of the area seen by the sensor.

The present invention employs three scanning sensors 10a, 10b and 10c, each of which has a field of view indicated by the numerals 32a, 32b and 32c, respectively, shown in FIG. 4C. By employing three such sensors 10a, b and c, the carbon granule 28 occupies an area which constitures about one-sixth of one sensor's field of view at a given time. Each sensor 10a, 10b and 10c scans one-third of the area 30 at a given ime. In this fashion, the use of multiple sensors greatly increases the granule area to filter tip area ratio as seen by each sensor.

Referring to FIG. 5, there is shown in detail the detection circuit of the invention for generating electrical signals for each cigarette passing through the area. The detection circuit comprises three sections, these being a sensor input section 34, an amplifier and filter section 36, and a reference and comparator section 28. The sensor input section 34 includes the silicon phototransistor 10 and a preamplifier 43. As the current through the phototransistor 10 varies in relation to the light intensity in the field of view of the phototransistor 10, this current is amplified by preamplifier 43 and is routed to amplifier 40 to produce a corresponding voltage at the output of such amplifier 40. As the current through the phototransistor 10 varies with the amount of light intensity, the voltage at the output of preamplifier 43 varies in direct relation to such current. This arrangement yields a negative voltage output for dark areas in the field of view of the phototransistor 10. The alternating current voltages across the phototransistor 10 and preamplifier 43 are coupled via a coupling capacitor 44 to an input resistor 42 leading into the amplifier section 36. As shown in FIG. 2, a white background 21a is provided in each sensor's field of view 20 so that the cigarette 14 being scanned and its white background is lighted in a manner whereby a carbon granule at the filter tip surface 18 will be the darkest area ever seen by the sensor 10.

The alternating current signals, produced as the filter tips 16 move in front of the sensing phototransistor 10, are amplified and inverted to yield a positive output signal for dark areas in amplifier circuits 40 and 41, the output of which is applied to the reference and comparator circuit 38. Here, the positive portion of the alternating current signal is separated from the signal by a diode 46 connected in series with the output of amplifier 41. The anode terminal 47 of diode 46 is connected to the amplifier circuit 41 and the cathode terminal 48 is connected to a reference capacitor 48. The positive pulses passing through the diode 46 act to charge the reference capacitor 48 to a voltage value that is equal to the maximum repeating positive output level from the amplifier 41 less the forward voltage drop across the diode 46. The value of this direct current charge across the capacitor 48 becomes a floating reference for the detection circuit.

The diode 46 is connected in parallel with a shunt resistor 50, and capacitor 48 is connected in series with an output resistor 52. As the reference capacitor 48 charges to its maximum or reference value, generally no current passes through diode 46 or capacitor 48 and the voltage across the output resistor 52 goes to zero or ground potential. After the reference capacitor has charged to its maximum value commensurate with the maximum repeating positive output level from the amplifier 41, all positive signals from the amplifier 41 are compared to the reference voltage across the capacitor 48. If the positive signals from the amplifier 36 are less than or equal to the reference voltage plus the voltage drop across the diode 46, the diode 46 remains in the reverse-bias condition and no current flows through the output resistor 52. If, however, the amplifier output is greater than the sum of the reference and diode voltages, the diode 46 will be placed in the forward-bias condition and, consequently, current will flow in the output circuit causing a voltage to appear across the output resistor 52. The voltage across resistor 52 will be equal to the difference between the amplifier output and the reference voltage plus the forward voltage across the diode 46. This forward bias condition is present when a dark spot passes into the sensor's field of view. Consequently, any voltage appearing across the output resistor 52 serves to indicate the presence of a dark area.

The shunt resistor 50 functions to provide a slow discharge of the reference capacitor 48 so that such capacitor can follow decreasing level changes caused by variations in color and texture of the filter tip materials passing across the sensor's field of view.

Figure 6A:
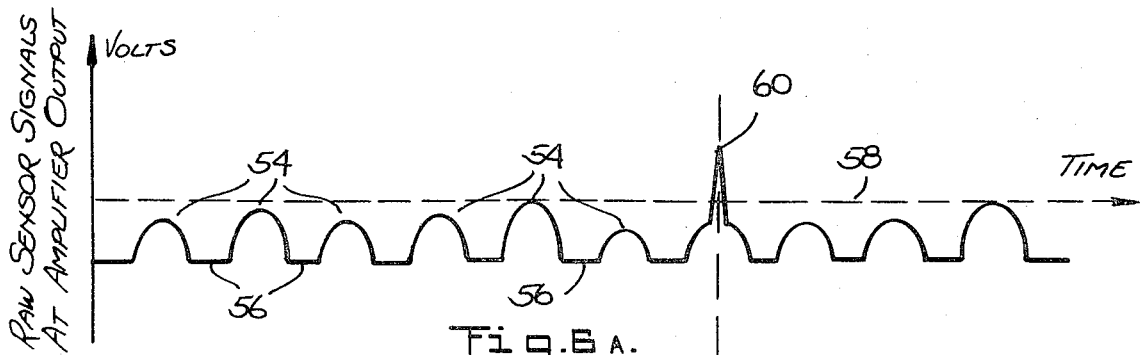
FIGS. 6A and 6B, respectively, illustrate the signals produced at the input to the reference and comparator circuit, and at the output of the reference and comparator circuit, respectively.

Referring to FIG. 6A, there is shown a voltage-time graph of the signals produced at the output of the amplifier 41. Specifically, the positive peaks produced from normal cigarettes are indicated by numeral 54. The lower or negative portion 56 of the signals result from the light reflected from the background 21a which is lighted by the background lamp 12c in the absence of the filter tip 16 in the phototransistor's field of view. As is apparent from the diagram, the relatively dark area presented to the phototransistor 10 by the presence of a filter tip 16 in the phototransistor's field of view produces a positive output signal from the phototransistor 10. The positive peaks 54 caused by the normal cigarettes provide a floating reference position 58 located at a voltage level which is the highest repeating signal level from the normal filter tips. These repeating signals 54 are amplified in amplifiers 40 and 41 to produce a floating reference level 58 on the reference capacitor 48.

In the case where a carbon granule is located at the surface of a filter tip 16, such relatively dark area in the sensor's field of view will produce a peak signal 60 from phototransistor 10 which when amplified by preamplifier 43 and amplifiers 40 and 41 is of greater amplitude than the floating reference level 58, thereby producing an indication of a faulty or defective cigarette.

Figure 6B:
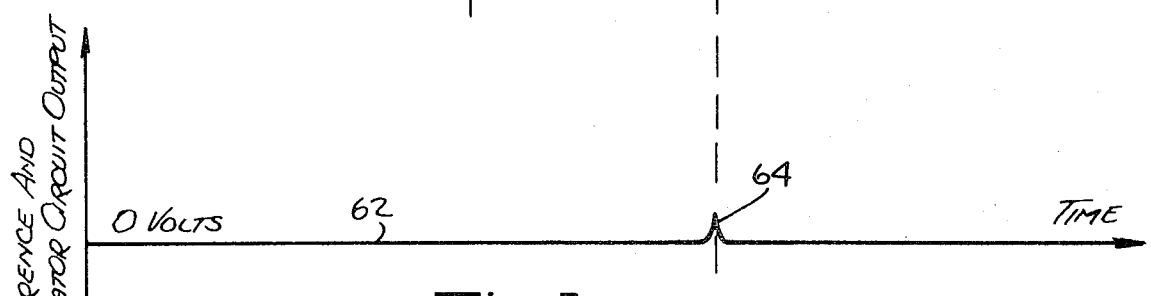

Referring to FIG. 6B, there is shown a voltage-time graph of the output signal of the reference and comparator circuit 38, indicated by numeral 62, corresponds to the floating reference 58 shown in FIG. 6A, except that the floating reference signal 62 is at zero or ground potential. The fault signal 60, shown in FIG. 6A, after passing through the reference and comparator circuit 38 provides a fault signal 64 across the output resistor 52. This fault signal 64 is used to indicate the detection of a defective cigarette for removal from the conveyor 24.

The device of the present invention provides both an accurate and fast means of detection of small carbon granules at the surface of cigarette filter tips. Detection can be accomplished at a scanning rate of 3,600 cigarettes per minute. As is readily apparent, utilization of the detection device described herein overcomes the problems otherwise involved when a small dark spot is detected against a relatively much larger scanning area, these problems being primarily the extremely small light variations caused by the small carbon granules, the speed of detection, and the variability in color and texture of the filter tips upon which the carbon granule is detected.

The floating reference derived in the detection circuitry provides increased resolution between the carbon particles and the cross-sectional area of the filter tip and automatically compensates for the many variables, listed above, that would otherwise cause failure or inaccurate measurements of devices employing a fixed typed of reference. In addition, the floating reference level 62, shown in FIG. 6B, is adjusted to ground or zero potential so that a fault signal can be amplified by an amount which yields a reasonable degree of resolution between the normal filter tip signal and the fault signal.

Figure 7:
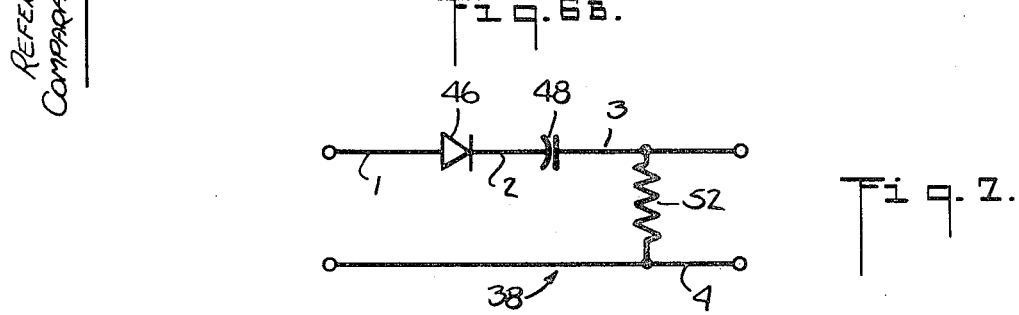
FIG. 7 shows the reference circuit portion of the detection circuitry shown in FIG. 5.
Figure 8A:
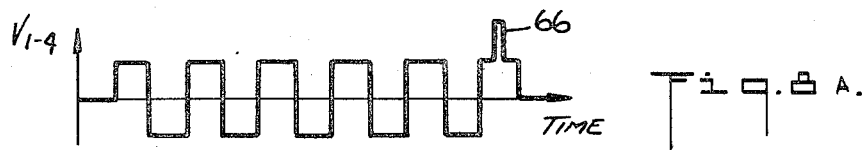
FIGS. 8A and through 8D are voltage-time graphs of the waveform signals produced across the various points of the circuit shown in FIG. 7.
Figure 8B:
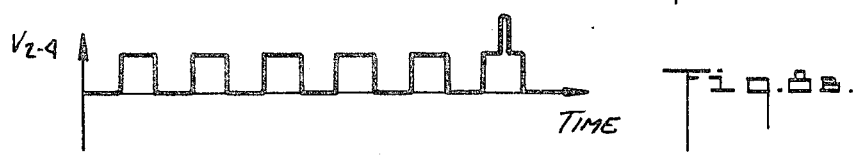
Figure 8C:
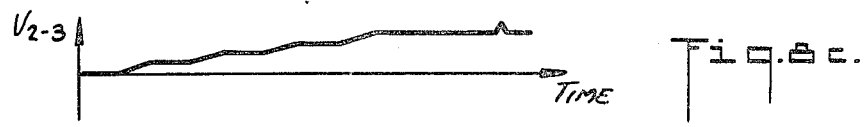
Figure 8D:
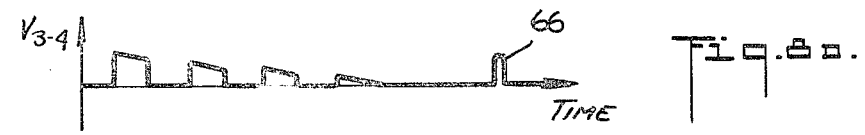

Referring to FIG. 7 and FIGS 8A through 8D there is illustrated the manner whereby the floating reference signal across the resistor 52 is automatically reduced to ground potential (zero volts) for normal cigarette signals. FIG. 7 shows a simplified form of the reference circuit 38 while FIGS. 8A-8D show the associated waveforms at differents points 1, 2, 3, and 4 in such circuit 38.

Referring to FIGS. 8A-8D, the input voltage ($V_{1-4}$) across the points 1 and 4 of the circuit 38 is an alternating-current, square-wave signal which becomes a pulsating, direct current waveform ($V_{2-4}$) after passing through the diode 46. Each time $V_{2-4}$ goes positive, the capacitor 48 slowly charges more and more so that voltage $V_{2-3}$ increases in a stair-step fashion until it is equal to the maximum value of $V_{2-4}$. Since $V_{2-4} = V_{2-3}$ plus $V_{3-4}$, as $V_{2-3}$ increases, $V_{3-4}$ must decrease. Consequently, when $V_{2-3}$ finally becomes equal to $V_{2-4}$ (max), the voltage across resistor 52 ($V_{3-4}$) has been reduced to zero volts or to ground potential. Now, if there is an input signal 66 that momentarily exceeds the normal positive value of the input signal, as is the case when a carbon particle passes a sensor, the large signal 66 will appear across resisotr 52 ($V_{3-4}$).

Referring again to FIG. 5, the amplifier and filter section 36 is designed to be more sensitive to the higher frequency signals than to the lower frequency so that the overall magnitude of amplification for the section 36 is greater for the higher frequencies than for the lower input signal frequencies. This is generally accomplished by means of the amplifier 40 which contains a capacitor 70 connected to a filter network at the output of amplifier 40 to cause the relatively higher frequency signals to be diverted or rolled off into the ground level line 72. Specifically, capacitor 44 is a coupling capacitor which passes all frequencies from about 30 Hz up. Resistor 42 is used to lower the impedance at the input of amplifier 40a for noise considerations. The 1K and 12K resistors 40b and 40c, respectively, provide a fixed amplifier gain of 12. The 0.01 µf capacitor 70 rolls off the high frequency response of the amplifier starting at several hundred Hz.

In a similar fashion, the amplifier 41 includes a low frequency roll off or diverter filter circuit constituted by a capacitor 73 and a resistor 74 connected between the emitter of its output amplifier transistor 76 and the ground line 72. The filter capacitor 73 is designed to divert the relatively low frequency signals appearing at the input to the transistor 76. Specifically, the amplifier 41 includes a 47 µf capacitor 75 for coupling to the output of section 40 through a 1K current limiting resistor 77 to the input of the common emitter transistor amplifier 76. This capacitor 75 passes all frequencies above about 30 Hz. Resistor 79 and 81 have values, respectively, of 390K and 47K and serve to bias the transistor amplifier 76. Resistor 83 is a transistor amplifier load resistor with a value of 6.8K. Resistor 74 is an emitter swamping resistor to achieve amplifier stability at varying temperatures. The 8µf capacitor 73 is used to bypass the emitter resistor 74 in such a manner that low frequencies passed by sections 40 and 41 are rolled off starting at several hundred Hz.

The exact positions of the high and low frequency roll off points for circuits 40 and 41 are determined by the rate at which cigarettes are passing in front of the detector. The frequency response of the amplifiers must be adequate to detect all wanted high-speed signals, but thereafter, the high-frequency capability must be curtailed to provide as much noise immunity as possible. At cigarette making machine speeds of 2,000 cigarettes per minute, the peak frequency response should be about 200 Hz and this value will vary directly with other machine speeds. The overall design of the filter circuits in the amplifier and filter section 36 is such that the higher frequency input signals created by the smaller carbon particles will be amplified by a larger factor than the lower frequency signals created by the larger carbon particles.

Figure 9A:
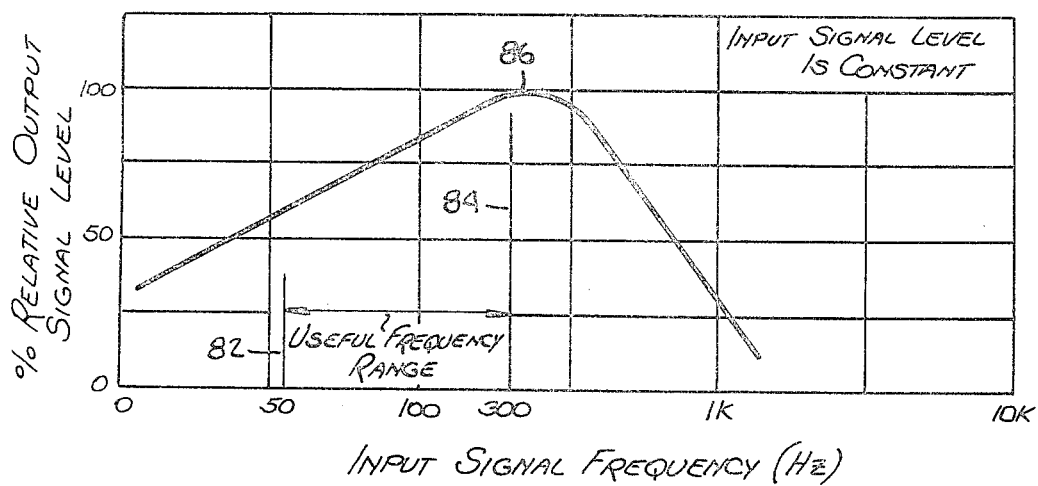
FIGS. 9A and 9B, respectively, are graphs of the frequency response characteristics of the detection circuitry, and the circuit response curves to detected particles of varying size.

Referring to FIG. 9A, there is shown a graph of the frequency response of the amplifier and filter section 36. Here, the ordinate scale represents the percent of the relative output signal level for a constant input signal level. The abscissa axis represents the input signal frequency to the amplifier and filter section 36. As shown, the ordinate scale is linear while the abscissa scale is logarithmic. If, for example, it is assumed that the useful input signal frequency range is approximately between 50 cycles per second and 300 cycles as indicated respectively by the lines 82 and 84, then the relative output signal level for a constant input signal increases in direct relation with the increasing input signal frequency. This relative output signal level is indicated by the numeral 86. The variable frequency response, as opposed to a flat frequency response, occurs as a result of the filter circuits described above with reference to the amplifier and filter section 36.

Figure 9B:
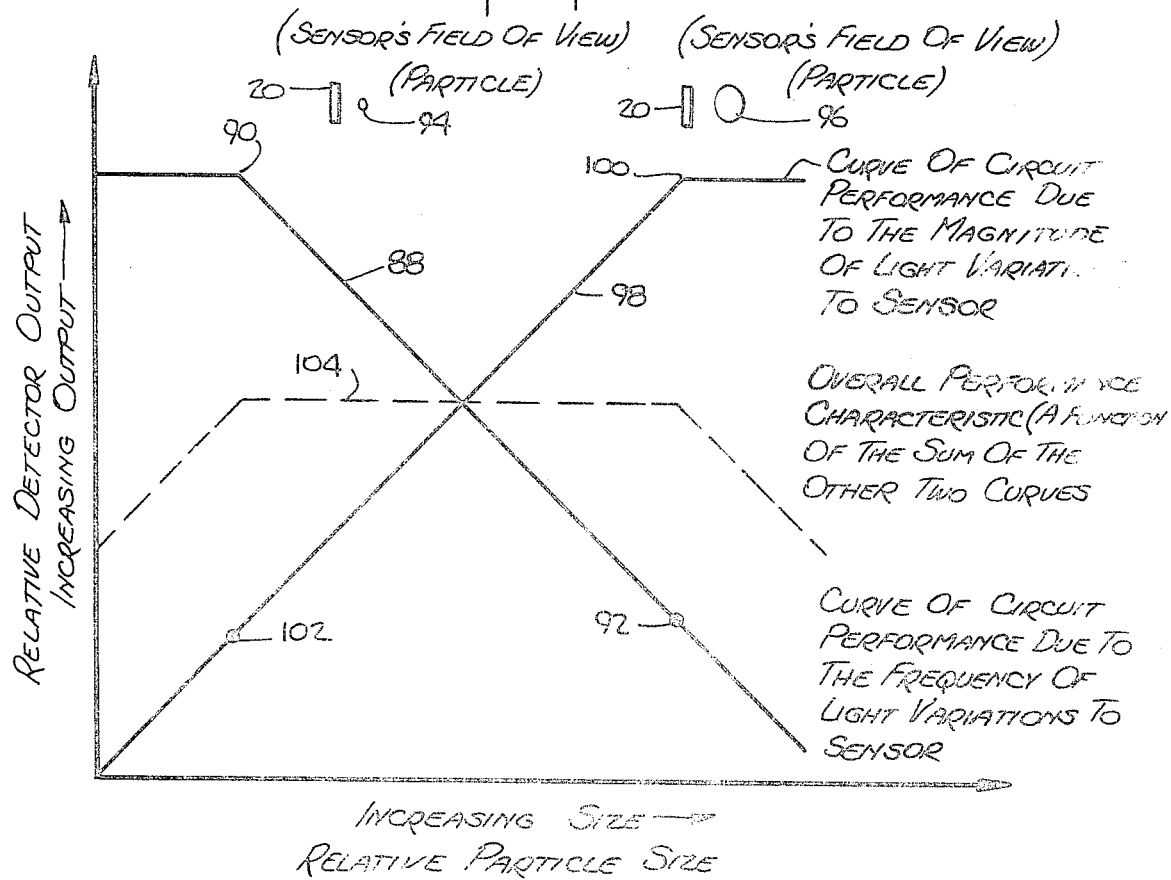

Referring now to FIG. 9B, there is shown a graphical representation of the frequency response curves for the detector device for various size carbon particles. Here, the ordinate axis represents the relative detector output, while the abscissa axis represents an increasing carbon particle size. The solid line curve 88 represents the circuit performance due to the change in frequency of the light variations in the field of view of the photosensor. As mentioned previously, when the smaller particles pass through the photosensor's field of view as represented by the point 90 on the line 88, such smaller particles create light variations that contain generally higher frequency components than the frequency components contained in the light variations caused by larger particles, such as at the point 92 on the line 88. The relative sizes of the carbon particles with respect to the photosensor's field of view, at the points 90 and 92, are respectively illustrated by the arrows at 94 and 96. Since the amplifier and filter section 36 is more sensitive to the relatively higher input frequency, as illustrated in FIG. 9A, then the device has a relatively greater output due to the higher frequencies of the smaller particles as shown by line 88. On the other hand, the solid line 98 is a curve of the circuit performance due to the magnitude of the light variations to the photosensor. The curve 98 clearly shows that the circuit performance increases in direct relation to the magnitude of the light variations, and the magnitude of the light variations in related to the carbon particle size. For example, the circuit performance or detector output is greater for the larger particles indicated at point 100 on the curve 98 than for the smaller particles indicated at point 102 of the curve 98.

The overall performance of the circuit is due to two factors, namely, both the magnitude of the light variations as indicated by curve 98, and the frequency of the light variations as indicated on curve 88. Therefore, the overall performance characteristic is a function of the sum of the two curves 88 and 98 and is indicated by the broken line curve 104. Curve 104 shows that the frequency response of the amplifier and filter circuit 36, indicated by curve 88, compensates for the variation in magnitude with the size of the carbon particle so that a substantially constant performance characteristic is provided for the various size carbon particles.

Figure 10:
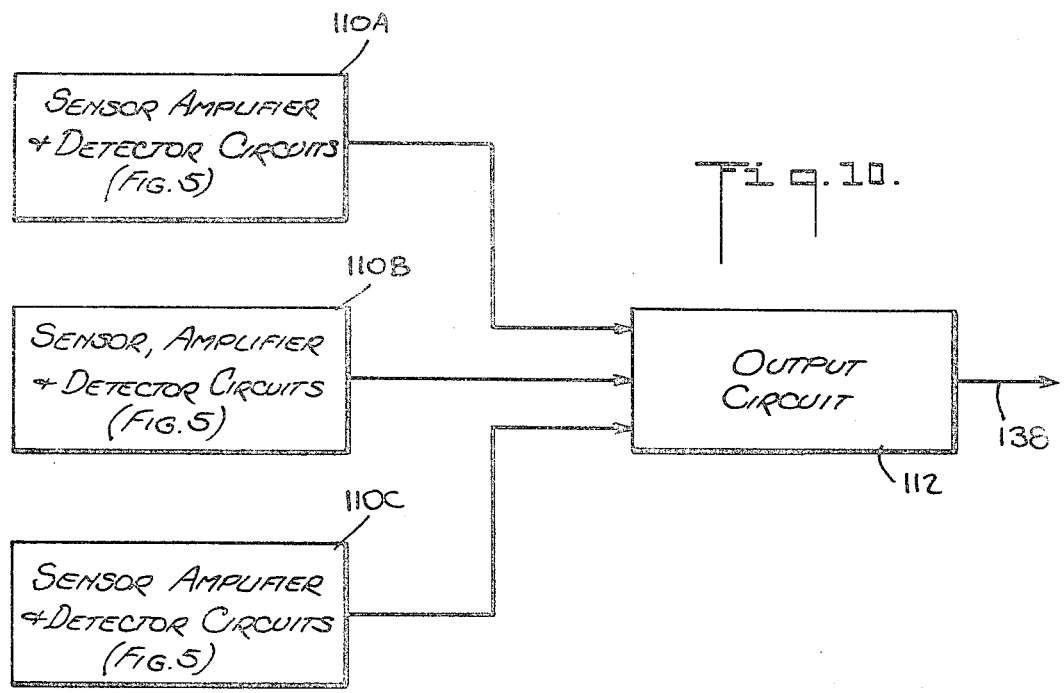
FIG. 10 is a system block diagram of the carbon detector of the present invention, illustrating a three-channel embodiment wherein three substantially identical detector circuits are embodied.

Referring to FIG. 10, there is shown a system block diagram of the entire electronics portion (excluding direct current power supplies) of the carbon detector. There are three independent sensor, amplifier and detector circuits 110A, 110B and 110C described with reference to the detection circuitry of FIG. 5. These three substantially identical circuits 110A, 110B and 110C are tied together by an output circuit 112. The single lighting system is common to all three channels. Details of the output circuit 112 are provided in FIG. 11.

Figure 11:
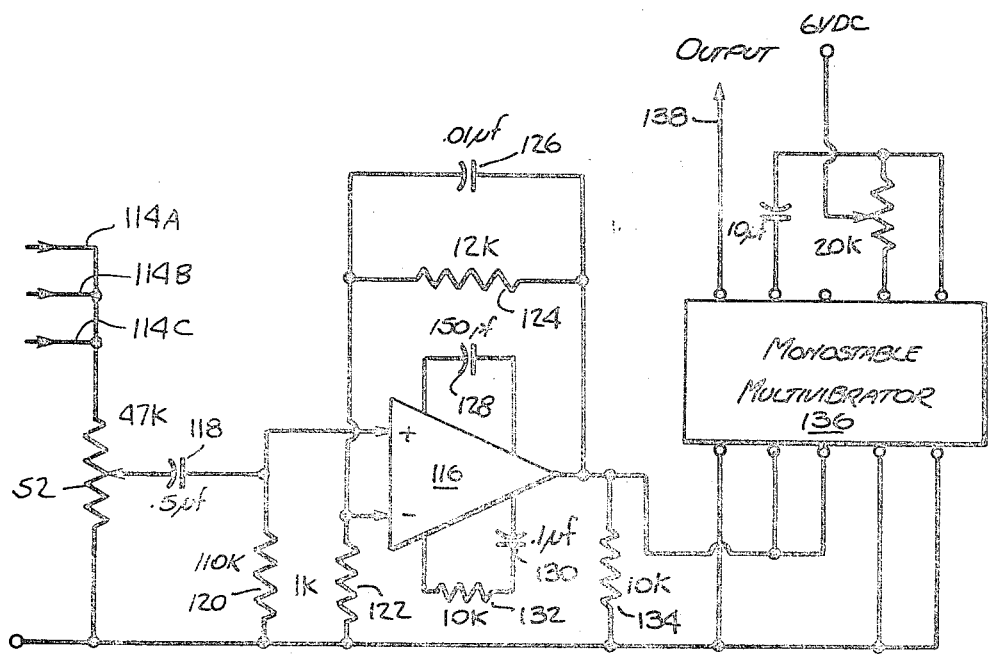
FIG. 11 shows an output circuit for receiving the outputs from each of the three detector circuits.

As shown in FIG. 11, the outputs from the three reference capacitors 48 are provided on input lines 114A, 114B and 114C, respectively, to a single common, 47K resistor 52. The outputs of the three sensor channels appear simultaneously across resistor 52. This is an acceptable situation since all three channels produce their respective ground potential reference signals across such common resistor, and a fault pulse from any channel will appear across such resistor 52. Resistor 52 is a potentiometer so that the magnitude of the signal across resistor 52 can be varied at the input to an integrated circuit amplifier 116. A 0.5µf coupling capacitor 118 and a 110K resistor 120 is connected across the amplifier input for noise consideration. The 1K and 12K resistors 122 and 124 fix the gain of the amplifier 116 to a value of 12. The 0.01 µf and 150 pf capacitors 126 and 128 as well as the series 0.1 µf capacitor 130 and 10K resistor 132 are used to stabilize the operation of the amplifier 116. A 10K resistor 134 is used as a load for the amplifier 116.

A monostable multivibrator 136 receives from the amplifier 116 the fault pulses of varying magnitude and duration and yields a pulse of consistent magnitude and duration on output line 138. Also, since an input voltage of specific minimum level is required to trigger the monostable multivibrator 136, low-level noise appearing across resistor 52 will not trigger such monostable multivibrator 136. By adjusting the potentiometer (or resistor) 52, fault signals of greater or lesser magnitudes can be selected to trigger the monostable. Consequently, one can select the minimum size filter tip fault to be detected.

Although the above description is directed to a preferred embodiment of the invention, it is noted that other variations and modifications will be readily apparent to those skilled in the art and, therefore, may be made without departing from the spirit and scope of the present disclosure.

What is claimed is:

1. Apparatus for detecting carbon granules and/or other dark areas on the end of cigarette filters, comprising:
  light energy source means for casting light on a cigarette filter being inspected;
  photoelectric sensing means positioned for individually scanning a filter tip, said photoelectric sensing means positioned at a vertical oblique angle relative to the longitudinal axis of said cigarette filter so that its field of view is directed onto the end surface of said filter tip along oblique lines relative to said longitudinal axis;
  means for providing a substantially white background in the field of view of said sensing means when a filter tip is not in said field of view in order to minimize light variations in the field of view of said sensing means as cigarettes pass through the inspection area; and
  circuit means connected to said photoelectric sensing means for producing a signal representative of the amount of light received by said photoelectric sensing means;
  whereby the dark area of carbon granules when scanned by said photoelectric sensing means will produce a fault signal differing from the signals produced when sensing normal filter tips without carbon granules on their end surface.

2. Apparatus as recited in claim 1, wherein said photoelectric sensing means comprises a plurality of stationary sensors positioned for scanning separate areas of the filter tip end surface.

3. Apparatus as recited in claim 1, wherein said photoelectric sensing means comprises silicon phototransistors.

4. Apparatus as recited in claim 1, wherein the openings of said photoelectric sensing means are positioned close to and opposite the end surface of the filter tips as said filter tips move relative to said photoelectric sensing means.

5. Apparatus as recited in claim 1, wherein said light energy source means includes at least one light source positioned so that its light rays reflect from the end portion of said filter tip before reaching said photoelectric sensing means.

6. Apparatus as recited in claim 5 wherein said light energy source means further includes at least one tipping paper lamp positioned to illuminate the tipping paper encircling said filter tip.

7. Apparatus as recited in claim 6, wherein said tipping paper lamp means is positioned on the cigarette filter side of the plane passing through and including the end surface of said filter tip so as to illuminate said tipping paper while not illuminating said end surface.

8. Apparatus for detecting carbon granules and/or other dark areas on the end of cigarette filters, comprising:
  light energy source means for casting light on a cigarette filter being inspected;
  photoelectric sensing means positioned for individually scanning a filter tip, said photoelectric sensing means positioned at an oblique angle relative to the longitudinal axis of said cigarette filter so that its field of view is directed onto the end surface of said filter tip along oblique lines relative to said longitudinal axis;
  a substantially white background screen located in the field of view of the photoelectric sensing means for viewing by said sensing means when a filter tip is not located in the inspection area, whereby the presence of a carbon granule will provide the darkest area viewed by said photoelectric sensing means; and
  circuit means connected to said photoelectric sensing means for producing a signal representative of the amount of light received by said photoelectric sensing means;
  whereby the dark area of carbon granules when scanned by said photoelectric sensing means will produce a fault signal differing from the signals produced when sensing normal filter tips without carbon granules on their end surface.

9. Apparatus as recited in claim 8, further including a background lamp positioned to provide illumination of said background screen.

10. Apparatus for detecting carbon granules and/or other dark areas on the end of cigarette filters, comprising:
  light energy source means for casting light on the end surface of a cigarette filter being inspected;
  photoelectric sensing means positioned for scanning a filter tip and providing electric current signals varying in relation to the amount of light intensity in the filed of view of said photoelectric sensing means; and
  circuit means in communication with the output of said photoelectric sensing means, said circuit means including an input diode and shunt resistor connected in series with a reference capacitor, whereby said capacitor develops a floating reference signal from the highest repeating signal levels produced from normal filter tips previously scanned, said circuit means also including means for comparing the instantaneous signal derived from said sensing means with said floating reference signal; whereby the dark area, when scanned by said sensing means, will produce an instantaneous sensing signal differing from said floating reference signal in a manner which indicates the presence of carbon granules and/or other dark areas.

11. Apparatus as recited in claim 10, wherein an output resistor is connected in series with said reference capacitor.

12. Apparatus as recited in claim 10, wherein the resistance of said shunt resistor in parallel with said diode is of a magnitude that permits a slow discharge of said reference capacitor so that said capacitor follows decreasing level changes in normal filter tips.

13. Apparatus as recited in claim 10, wherein said photoelectric sensing means is connected for communication with said diode and shunt resistor through an amplifier circuit, with the output of said amplifier circuit connected to the anode terminal of said diode and to one side of said shunt resistor, and the cathode terminal of said diode is connected to the other side of said resistor and to said reference capacitor.

14. Apparatus as recited in claim 10, wherein said circuit means is designed with its floating reference level adjusted to ground potential, so that the signals produced from normal filter tips are not amplified while the signals produced from faulty filter tips are amplified.

15. Apparatus for detecting carbon granules and/or other dark areas on the end of cigarette filters, comprising:

light energy source means for casting light on the end surface of a cigarette filter being inspected;

photoelectric sensing means positioned for scanning a filter tip and providing electric current signals varying in relation to the amount of light intensity in the filed of view of said photoelectric sensing means;

circuit means in communication with the output of said photoelectric sensing means for producing a floating reference signal which is obtained from the highest repeating signal levels from normal filter tips previously inspected, said circuit means including means for comparing the instantaneous signal derived from said sensing means with said floating reference signal whereby the dark area, when scanned by said sensing means, will produce an instantaneous sensing signal differing from said floating reference signal in a manner which indicates the presence of carbon granules and/or other dark areas; and an amplifier and filter section included in said circuit means and connected at the output of said photoelectric sensing means, said amplifier and filter section network designed to be more responsive to the higher frequency sinals produced by the smaller carbon granules than to the relatively lower frequency signals produced by the larger carbon granules, whereby the overal magnitude of amplification for said amplifier and filter section is greater for the input signals of higher frequencies than for the lower frequencies.

16. Apparatus for detecting carbon granules and/or other dark areas on the end of cigarette filters, comprising:

light energy source means for casting light on the end surface of a cigarette filter being inspected;

photoelectric sensing means positioned for scanning a filter tip and providing electric current signals varying in relation to the amount of light intensity in the field of view of said photoelectric sensing means;

circuit means in communication with the output of said photoelectric sensing means for producing a floating reference signal which is obtained from the highest repeating signal levels from normal filter tips previously inspected, said circuit means including means for comparing the instantaneous signal derived from said sensing means with said floating reference signal whereby the dark area, when scanned by said scanning means, will produce an instantaneous sensing signal differing from said floating reference signal in a manner which indicates the presence of carbon granules and/or other dark areas; and an amplifier means included in said circuit means and connected to the output of said photoelectric sensing means, and capacitor filter means connected to said amplifier means for filtering out both the high frequency response and the low frequency response of said amplifier means in a manner whereby the useful frequency range of said circuit means lies between said high and low frequencies and is responsive to both the smaller and larger carbon granules as they are scanned by said photoelectric sensing means.

17. Apparatus as recited in claim 16, wherein said useful frequency range is between a low frequency of about 50 cycles per second a high frequency of about 300 cycles per second.

18. Apparatus as recited in claim 16, wherein said amplifier means and said capacitor filter means provide a maximum frequency response near the high frequency side of said useful frequency range.

19. Apparatus for detecting carbon granules and/or other dark areas on the end of cigarette filters, comprising: light energy source means for casting light on the end surface of a cigarette filter being inspected;

a plurality of photoelectric sensors positioned for scanning different areas on a filter tip and providing electric current signals varying in relation to the amount of light intensity in the field of view of said photoelectric sensing means;

a plurality of detector circuits individually connected to a respective output of said photoelectric sensors, said circuit means including an input diode and shunt resistor connected in series with a reference capacitor, whereby said capacitor develops a floating reference signal which continuously varies in accordance with the highest repeating signal levels produced from normal filter tips previously scanned, each of said detector circuits including means for comparing the instantaneous signal derived from said sensing means with said floating reference signal, whereby the dark area, when scanned by said sesning means, will cause an instantaneous sensing signal differing from said floating reference signal in a manner which indicates the presence of carbon granules and/or other dark areas; and an output circuit connected to the outputs of said detector circuits, said output circuit producing an output fault signal when any one of said detector circuits detects a carbon granule and/or other dark area.

20. Method of detecting carbon granules and/or other dark areas on the end of a cigarette filters, comprising:

moving a plurality of cigarette filters through an inspection zone, one by one;

lighting each cigarette filter and it passes into such inspection zone;

scanning the end surface of said cigarette filter with photoelectric sensing means to provide electrical signals representative of the amount of lightness or darkness of the filter surface scanned;

continuously generating a floating reference signal having a voltage level which is derived from and varies continuously in accordance with the highest repeating signal levels from normal filters previously scanned; and comparing the instantaneous signals produced from said photoelectric sensing means with said floating reference signal; whereby a dark area scanned by said photoelectric sensing means will produce an instantaneous sensing signal differing from said floating reference signal in a manner which indicates the presence of carbon granules and/or other dark areas.

21. Method of detecting carbon granules and/or other dark areas on the end of cigarette filters, comprising:

moving a plurality of cigarette filters through an inspection zone, one by one;

lighting each cigarette filter as it passes into such inspection zone;

scanning the end surface of said cigarette filter with photoelectric sensing means to provide electrical signals representative of the amount of lightness or darkness of the filter surface scanned;

filtering said signals provided by said photoelectric sensing means with an amplifier and filter network which is more responsive to the higher frequency signals produced by smaller carbon granules than to the relatively lower frequency signals produced by larger carbon granules;

generating a floating reference signal having a voltage level which is derived from the highest repeating signal levels from normal filters previously inspected; and comparing the instantaneous signals produced from said photoelectric sensing means with said floating reference signal;

whereby a dark area scanned by said photoelectric sensing means will produce an instantaneous sensing signal differing from said floating reference signal in a manner which indicates the presence of carbon granules and/or other dark areas.

22. Apparatus for detecting dark particles or spots in relatively light objects passing at high speeds through an inspection zone;

a source of light energy for casting light on the objects being inspected;

photoelectric sensing means positioned for scanning said objects, said sensing means having a field of view wherein said dark particles or spots will represent the darkest area seen by said sensing means;

circuit means in communication with the output of said photoelectric sensing means, said circuit means including an input diode and a shunt resistor connected in series with a reference capacitor, whereby said capacitor develops a floating reference signal which continuously varies in accordance with the highest repeating signal levels from normal objects previously scanned without said dark particle or spots thereon; and means for comparing the instantaneous signal derived from said sensing means with said floating reference signal;

whereby the dark particle or spot when scanned by said sensing means will produce an instantaneous sensing signal differing from said floating reference signal in a manner which indicates the presence of dark particles or spots.

* * * * *

UNITED STATES PATENT OFFICE
CERTIFICATE OF CORRECTION

Patent No. 3,818,223     Dated June 18, 1974
(Appln. No. 339,342)     (Filed March 8, 1973)

Inventor(s) Gerald Warren Gibson; Ned A. Sigmon and Ransom Pitts Kirby

It is certified that error appears in the above-identified patent and that said Letters Patent are hereby corrected as shown below:

```
Column 1, line 34, correct spelling of "smudges"
   "     "   44, correct spelling of "field"
   "     "   54, change "for" to --from--

"    2, line 17, correct spelling of "small"
   "     "   18, correct spelling of "cigarette"
   "     "   42, correct spelling of "faulty"

"    3, line 27, correct spelling of "term"
   "     "   45, correct spelling of "signals"

"    5, line 16, correct spelling of "field"
   "     "   53, correct spelling of "field"

"    6, line 18, correct spelling of "constitutes"
   "     "   22,     "        "      "  "time"
   "     "   30, change "28" to --38--

"    9, line  3, change "0.01" to --.01--

"   10, line 21, change "in" to --is--
   "     "   37, change "substantially" to --substantial--
   "     "   62, change "0.5" to --.5--
   "     "   65, change "0.01" to --.01--

"   12, claim 10, line 49, "field" is misspelled.

"   13, claim 15, line 28, ditto.

"   13, claim 15, line 47, "signals" is misspelled.
```

UNITED STATES PATENT OFFICE
CERTIFICATE OF CORRECTION

Patent No. 3,818,223     Dated June 18, 1974
   (Appln. No. 339,342)     Filed (March 8, 1973)

Inventor(s) Gerald Warren Gibson; Ned A. Sigmon & Ransom Pitts Kirby

It is certified that error appears in the above-identified patent and that said Letters Patent are hereby corrected as shown below:

Column 13, claim 15, line 50, "overall" is misspelled.

Column 14, claim 16, line 5, change "scanning" to --sensing--

Column 14, claim 17, line 24, word "and" should appear after "second".

Column 14, claim 20, line 62, word "a" after "of" should be omitted.

Column 14, claim 20, line 67, word "and" should be --as--

Signed and sealed this 1st day of October 1974.

(SEAL)
Attest:

McCOY M. GIBSON JR.        C. MARSHALL DANN
Attesting Officer          Commissioner of Patents